C. P. STEVENS.
HARROW ATTACHMENT FOR CULTIVATORS.
APPLICATION FILED MAY 3, 1911.
1,004,307.
Patented Sept. 26, 1911.
2 SHEETS—SHEET 2.
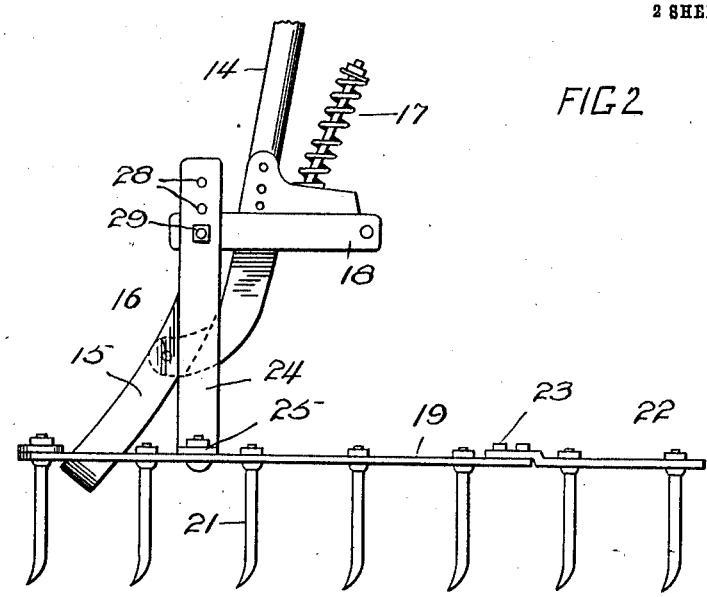
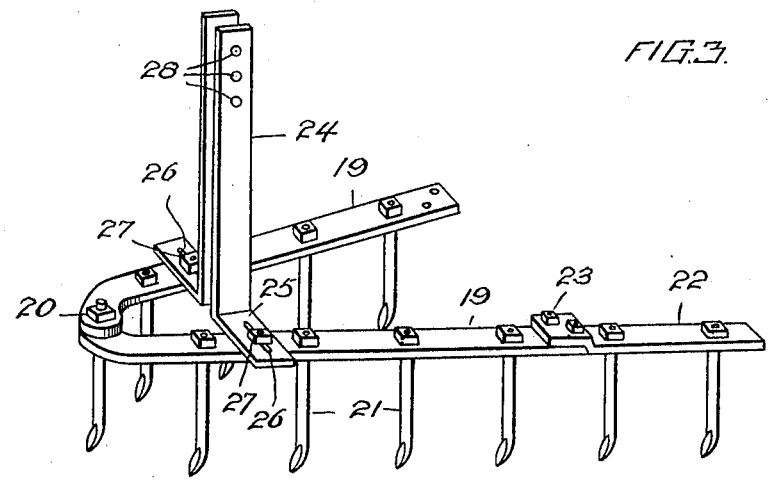

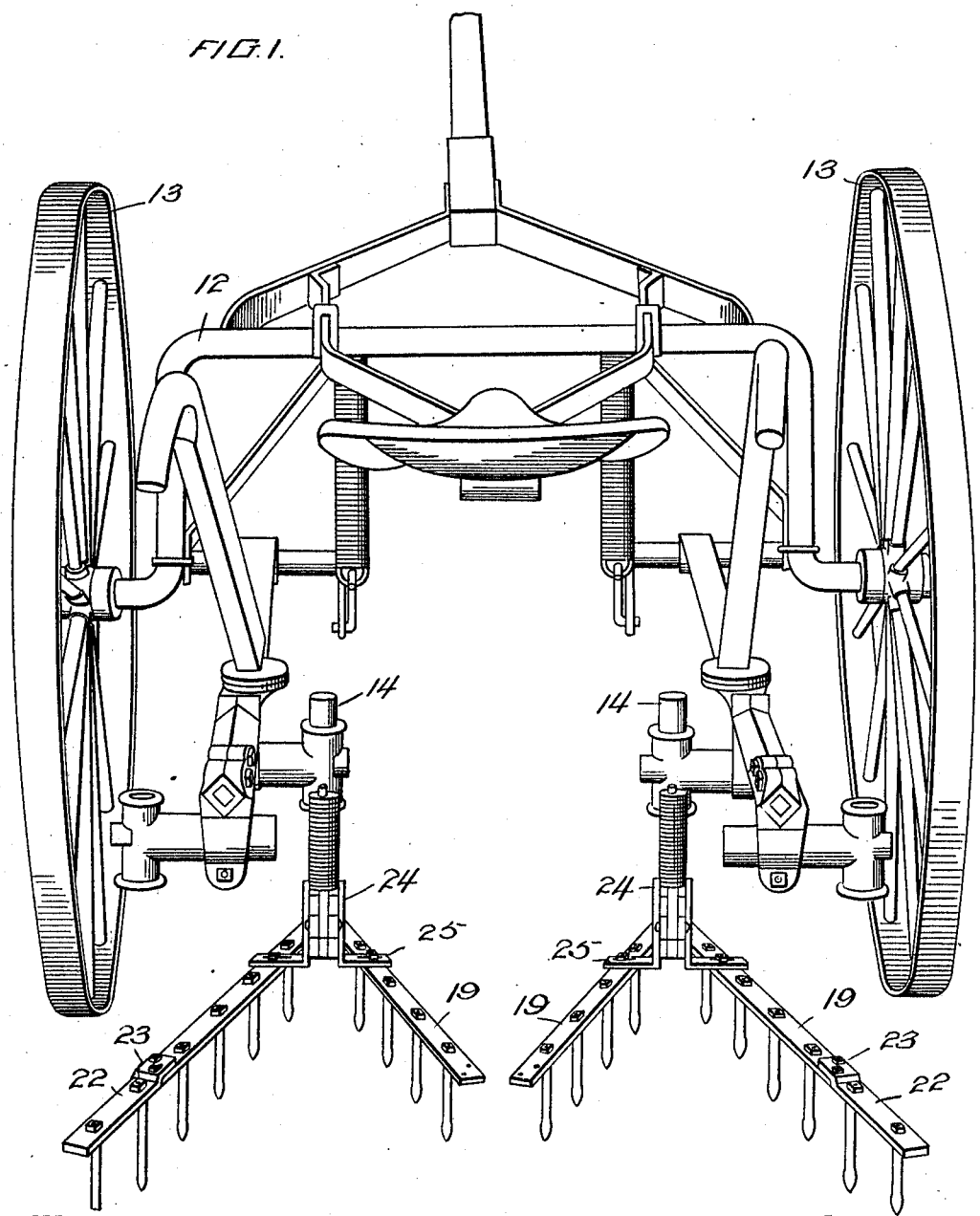

UNITED STATES PATENT OFFICE.

CHARLES P. STEVENS, OF MERKEL, TEXAS.

HARROW ATTACHMENT FOR CULTIVATORS.

1,004,307.  Specification of Letters Patent.  Patented Sept. 26, 1911.

Application filed May 3, 1911. Serial No. 624,858.

*To all whom it may concern:*

Be it known that I, CHARLES P. STEVENS, a citizen of the United States, residing at Merkel, in the county of Taylor and State of Texas, have invented or discovered certain new and useful Improvements in Harrow Attachments for Cultivators, of which the following is a specification, reference being had therein to the accompanying drawings.

This invention has for its general object to provide an attachment which may be applied to a cultivator of any standard or usual type whereby the surface of the ground between rows of growing crops may be stirred or broken up.

The more particular objects of the invention are to provide a device in the nature of a harrow by which the surface of the ground may be worked after planting or after rain when the soil beneath the surface is too moist to be worked advantageously by the cultivator itself, which attachment may be easily and quickly applied or removed, and which may be adjusted, both as to its form and size and as to its attachment to the cultivator, in accordance with the type and size of the cultivator on which it is used and with the requirements of the work.

These and other objects of the invention, together with means whereby the same may be carried into effect, will best be understood from the following description of one form or embodiment thereof illustrated in the accompanying drawings. It is to be understood, however, that the construction described and shown has been chosen for illustrative purposes merely, and that the invention may be embodied in other forms without departing from the spirit and scope thereof.

In said drawings: Figure 1 is a perspective view, looking from the rear, of a cultivator having my attachment applied thereto, and illustrating one adjustment and arrangement of the various parts. Fig. 2 is a side elevation of a cultivator foot with one of the units of the attachment secured thereto. Fig. 3 is a perspective view of the unit shown in Fig. 2 detached from the foot.

The cultivator herein shown is of a well known type comprising a frame 12 mounted on wheels 13 and carrying a suitable number of feet 14, herein shown as four, to which are connected the cultivator blades (not shown). The cultivator blades are usually bolted or otherwise secured to arms 15 pivoted, at 16, to the lower end of the feet 14. This pivotal mounting is for the purpose of permitting the blades to trip to pass obstructions, said blades being held in normal position by yielding devices 17 connected with the arms 15 by links 18.

The attachment constituting the present invention comprises one or a plurality of similar units each including a pair of diverging members 19 pivoted together at 20 and carrying a suitable number of preferably detachable harrow teeth 21 one of which may, if desired, constitute the pivot 20. Each of the members 19 is provided with a detachable extension 22 also provided with a suitable number of teeth and removably connected to the corresponding member 19 by bolts 23.

For connecting the attachment or each unit thereof to the corresponding cultivator foot there is provided a pair of uprights comprising angular plates each having an upright portion 24 and a horizontal portion 25. The horizontal portion 25 of each of these plates is provided with a slot 26 adapted to receive a bolt 27 carried by the corresponding member 19, whereby the plate is made adjustable transversely to said member. This horizontal adjustability of the uprights relative to the members 19 permits said uprights to be moved toward and from each other to accommodate them to the proportions of the particular cultivator to which the attachment is applied, permits the members 19 to be separated or brought together about their pivot 20, and also permits the unit as a whole to be moved laterally, to a certain extent, with respect to the cultivator foot. The upright portion 24 of each of the plates is provided with means whereby the same may be adjustably and detachably connected to the cultivator foot. To this end, in the construction shown, said upright portion is provided with a plurality of perforations 28 either of which is adapted to receive the bolt 29 connecting the arm 15 and links 18.

In order to apply the attachment to a cultivator the cultivator blade is first removed from its supporting arm 15 and the attachment frame is brought into a position to rest upon said arm. The bolt 29 is then removed and replaced through the proper perforations 28, according to the adjustment required for the particular cultivator with which the attachment is used. The necessary adjustments of the attachment are made in accordance with the requirements of the work. It will be observed that inasmuch as the attachment is applied to the usual cultivator blade arm 15, which is yieldingly connected to the cultivator foot 14, the attachment will be permitted to trip in striking any obstruction in the same manner as the cultivator blade.

In Fig. 1 of the drawing is shown one arrangement employing an attachment comprising two of the units above described. In accordance with this arrangement these units are applied to the two inside cultivator feet, the detachable extensions 22 of the two adjacent members 19 of these units are removed, and these members so adjusted about the pivots 20 as to leave a space between the ends of these members 19 of the two units for the accommodation of the row of growing plants. The other members 19 of each of the units have applied thereto their extensions 22, and each is so adjusted that it, together with its complementary member, will cover the entire space between two rows.

Other arrangements employing a fewer or larger number of units, in accordance with the type of cultivator and the requirements of the work, will readily suggest themselves. For example, where the rows are close together and where the cultivator is provided with four feet, a unit may be applied to each foot, in which case the extensions 22 may be removed from all of the members 19 and these arms turned upon their pivots 20 so as to lie relatively close together. On the other hand, where the cultivator has a central foot, an attachment comprising a single unit may be applied to this foot, one of the teeth 21 being removed, or, where this tooth constitutes the pivot 20, reversed, as will be familiar to those skilled in the art, to accommodate the row, while the extensions 22 are applied to the arms 19 and these arms adjusted on their pivot 20 so as to diverge at a relatively wide angle. Whatever the number and arrangement of the units used, it will be observed that the slots 27 in the angular plates will permit a slight adjustment of the attachment laterally of the cultivator foot to accommodate it to the conditions of use.

Having thus described my invention I claim and desire to secure by Letters Patent:

1. A harrow attachment for cultivators comprising a pair of diverging members, a pair of angular plates having each a horizontal slotted portion and an upright portion provided with a plurality of perforations, and bolts carried by said members and passing through the slots in the horizontal portions of said plates.

2. A harrow attachment for cultivators comprising a pair of diverging members pivoted together at their forward ends, detachable extensions carried by said members at their rearward ends, a pair of angular plates having each a horizontal slotted portion and an upright portion provided with a plurality of perforations, and bolts carried by said members and passing through the slots in the horizontal portions of said plates.

In testimony whereof I affix my signature, in presence of two witnesses.

CHAS. P. STEVENS.

Witnesses:
WILLIAM I. MYERS,
JAS. A. COLLINS.

Copies of this patent may be obtained for five cents each, by addressing the "Commissioner of Patents, Washington, D. C."